(12) United States Patent
Luke

(10) Patent No.: US 8,529,171 B1
(45) Date of Patent: Sep. 10, 2013

(54) APPARATUS FACILITATING REMOVAL OF BROKEN FASTENERS FROM AN ENGINE

(76) Inventor: Josh Luke, Marion, SD (US)

(*) Notice: Subject to any disclaimer, the term of this patent is extended or adjusted under 35 U.S.C. 154(b) by 733 days.

(21) Appl. No.: 12/764,173

(22) Filed: Apr. 21, 2010

(51) Int. Cl.
*B23B 47/28* (2006.01)

(52) U.S. Cl.
USPC .................................. 408/115 R; 408/97

(58) Field of Classification Search
USPC ............... 408/72 B, 115 B, 115 R, 95, 97
IPC ....................................... B23B 47/28
See application file for complete search history.

(56) References Cited

U.S. PATENT DOCUMENTS

| | | | | |
|---|---|---|---|---|
| 1,890,663 | A * | 12/1932 | Alden et al. | 408/72 B |
| 2,651,951 | A * | 9/1953 | Altenburger | 408/97 |
| 3,769,648 | A * | 11/1973 | Haselmo | 470/209 |
| 3,799,687 | A * | 3/1974 | Anderson | 408/75 |
| 4,740,117 | A * | 4/1988 | Schaff Deleury et al. | 408/72 B |
| 5,056,965 | A * | 10/1991 | Tsui et al. | 408/72 B |
| 6,499,918 | B1 * | 12/2002 | Murphy | 408/87 |
| 2005/0204542 | A1 | 9/2005 | Pittman | |

FOREIGN PATENT DOCUMENTS

RU 2109601 C1 * 4/1998

* cited by examiner

*Primary Examiner* — Daniel Howell
*Assistant Examiner* — Michael Vitale
(74) *Attorney, Agent, or Firm* — Jeffrey A. Proehl; Woods, Fuller, Shultz & Mith, P.C.

(57) ABSTRACT

An apparatus for removing broken fasteners from an engine cylinder head having a plurality of internally-threaded bores formed therein. The apparatus may comprise a guide plate having a first surface and a second surface, with the second surface being for positioning toward the cylinder head. The guide plate may have a plurality of apertures formed therein to correspond to bores of cylinder heads, and the apertures may extend through the guide plate from the first to the second surface. The apparatus may include a plurality of securing elements removably insertable into one of the apertures for removably securing the guide plate to the cylinder head. The apparatus may include a plurality of drill positioning sleeves removably positionable in the apertures of the guide plate. The apparatus may also include sleeve securing structures associated with each of the apertures to removably secure one of the drill positioning sleeves in the aperture.

18 Claims, 7 Drawing Sheets

APPARATUS FACILITATING REMOVAL OF BROKEN FASTENERS FROM AN ENGINE

BACKGROUND

1. Field

The present disclosure relates to engine repair tools and more particularly pertains to a new apparatus facilitating removal of broken fasteners from an engine.

2. Description of the Prior Art

The removal of a manifold from the cylinder head of an engine often results in the breaking of one of the retaining fasteners as the fastener is attempted to be removed. The retaining fastener may comprise a stud that is threaded into a blind bore in the cylinder head, or a bolt that is threaded into the bore. When either type of fastener breaks, the removal of the broken fastener from the bore can be difficult, particularly when the technician must work within the confines of an engine bay with numerous other components located close to the cylinder head. Drilling into the broken fastener located in the bore is difficult and the threads of the bore can be damaged if the orientation of the bit is not aligned with the axis of the bore. Other tools used in the process also require accurate alignment that is difficult due to the proximity of other elements. Not only does the closeness of the other elements of the engine restrict the use of power and hand tools, it also limits the room for the technician to move his or her hands while attempting to maneuver the various tools and parts.

SUMMARY

In view of the foregoing, the present disclosure describes a new apparatus facilitating removal of broken fasteners from an engine which may facilitate the process in the close spaces typically encountered in the engine compartment of a vehicle.

The present disclosure relates to an apparatus for removing broken fasteners from an engine cylinder head having a plurality of internally-threaded bores formed therein. The apparatus may comprise a guide plate having a first surface and a second surface, with the second surface being for positioning toward the cylinder head. The guide plate may have a plurality of apertures formed therein to correspond to bores of cylinder heads. Each of the apertures may extend through the guide plate from the first surface to the second surface. The apparatus may comprise at least one securing element for removably securing the guide plate to the cylinder head, and the securing elements may be removably insertable into one of the apertures. The apparatus may also include a plurality of positioning sleeves removably positionable in the apertures of the guide plate. The apparatus may further include sleeve securing structures associated with each of the apertures to removably secure one of the drill positioning sleeves in the aperture.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
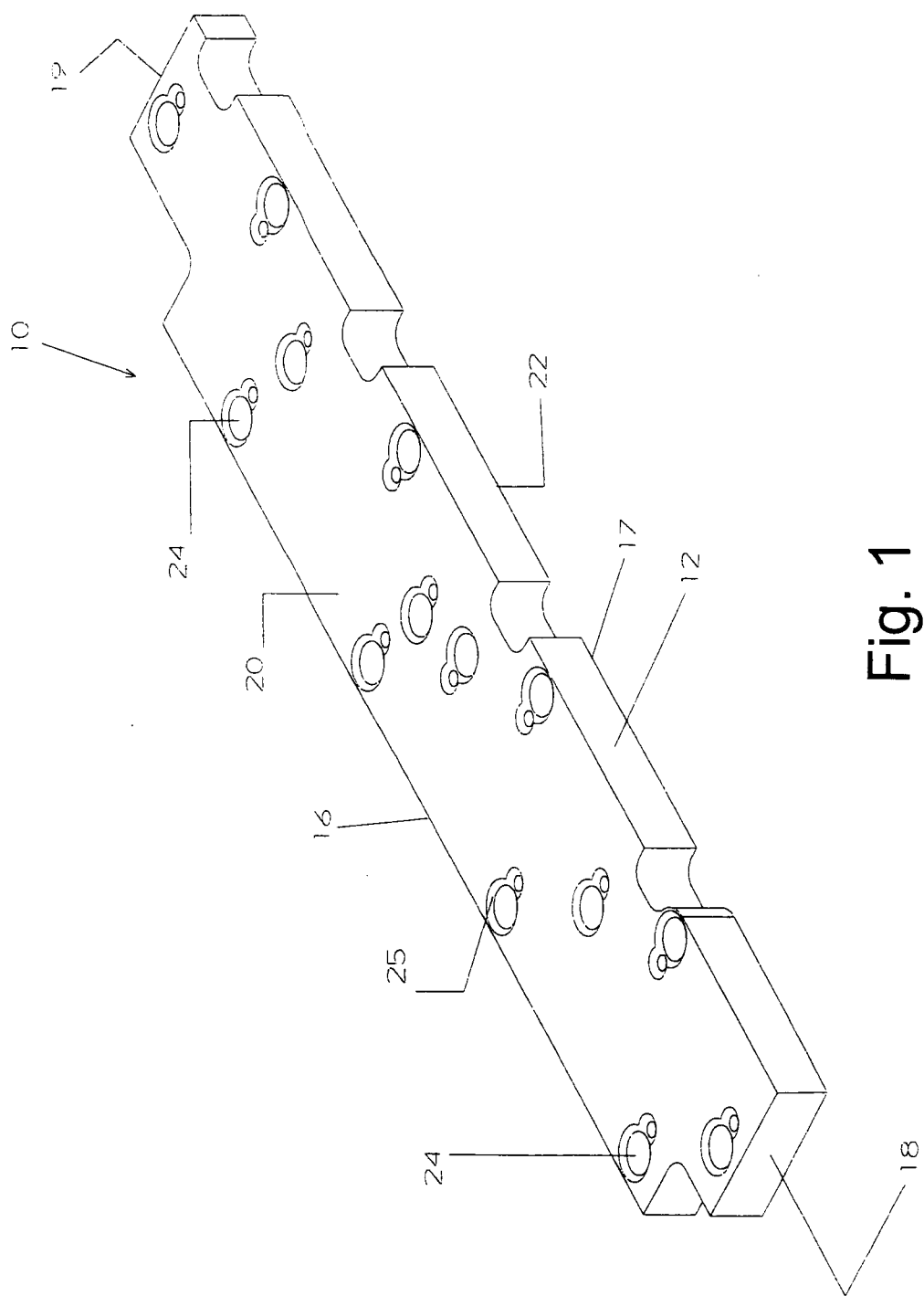
FIG. 1 is a schematic perspective view of a new apparatus facilitating removal of broken fasteners from an engine according to the present disclosure.
Figure 2:
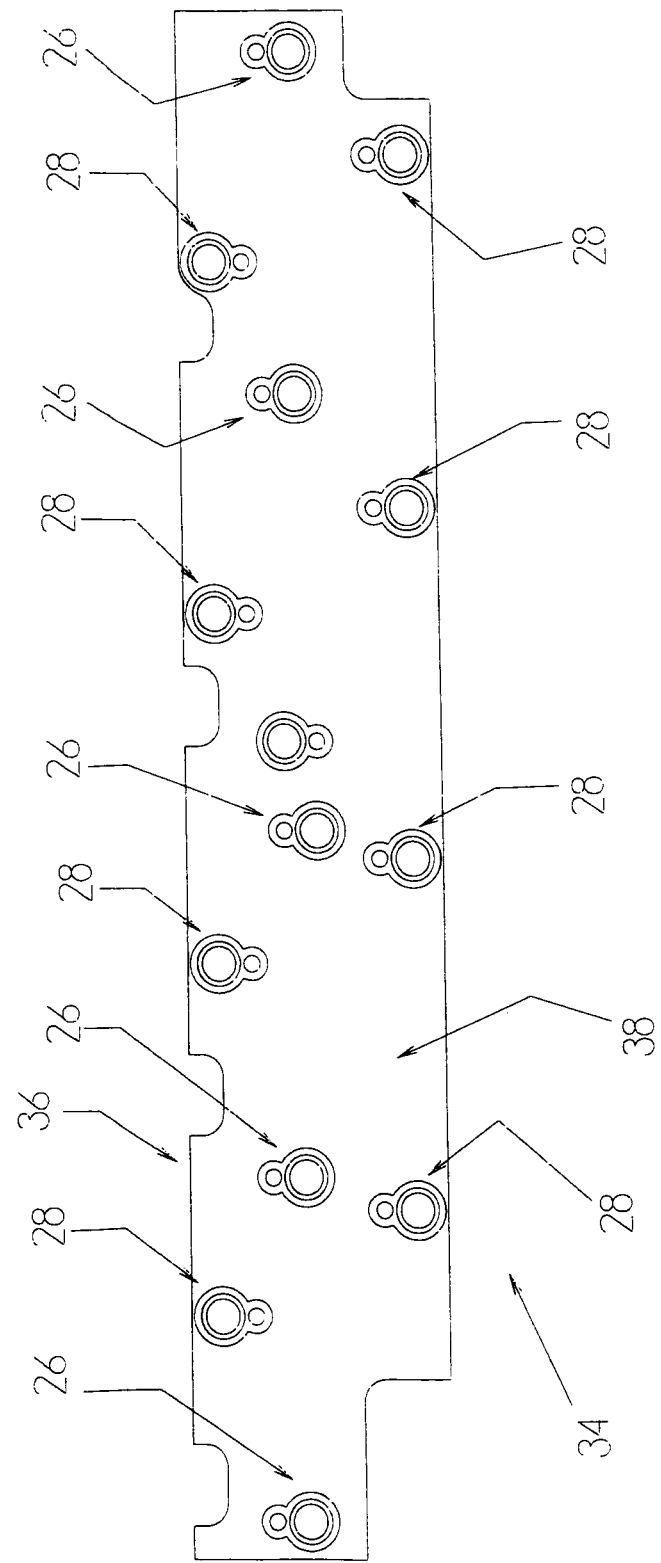
FIG. 2 is a schematic top view of the apparatus, according to an illustrative embodiment.
Figure 3:
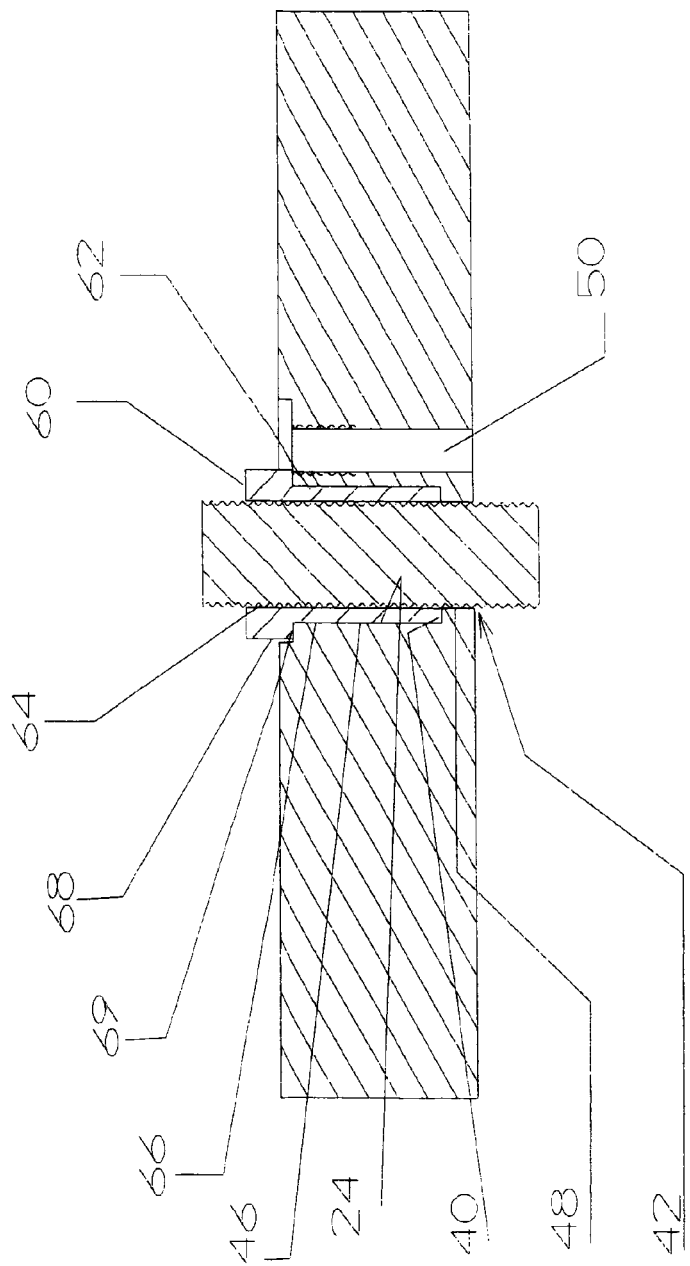
FIG. 3 is a schematic side sectional view of one of the apertures with a tap guide sleeve positioned therein, according to an illustrative embodiment.
Figure 4:
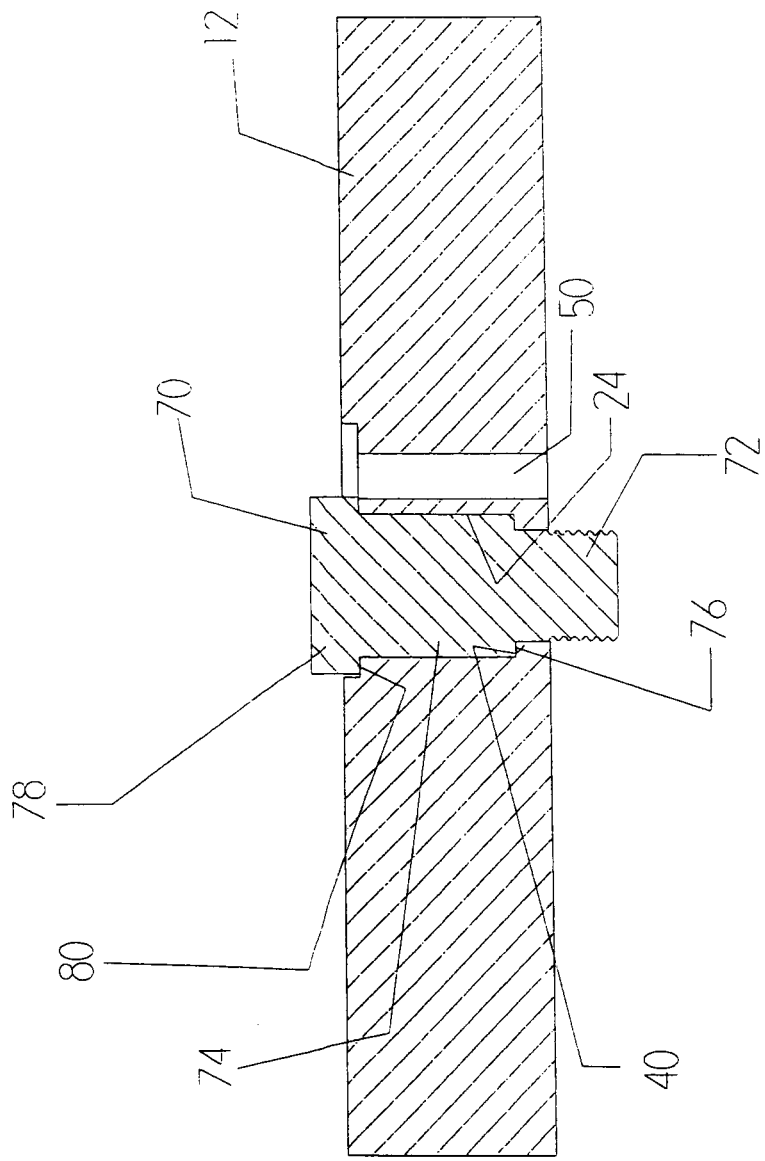
FIG. 4 is a schematic side sectional view of one of the apparatus with a securing bolt positioned therein, according to an illustrative embodiment.
Figure 5:
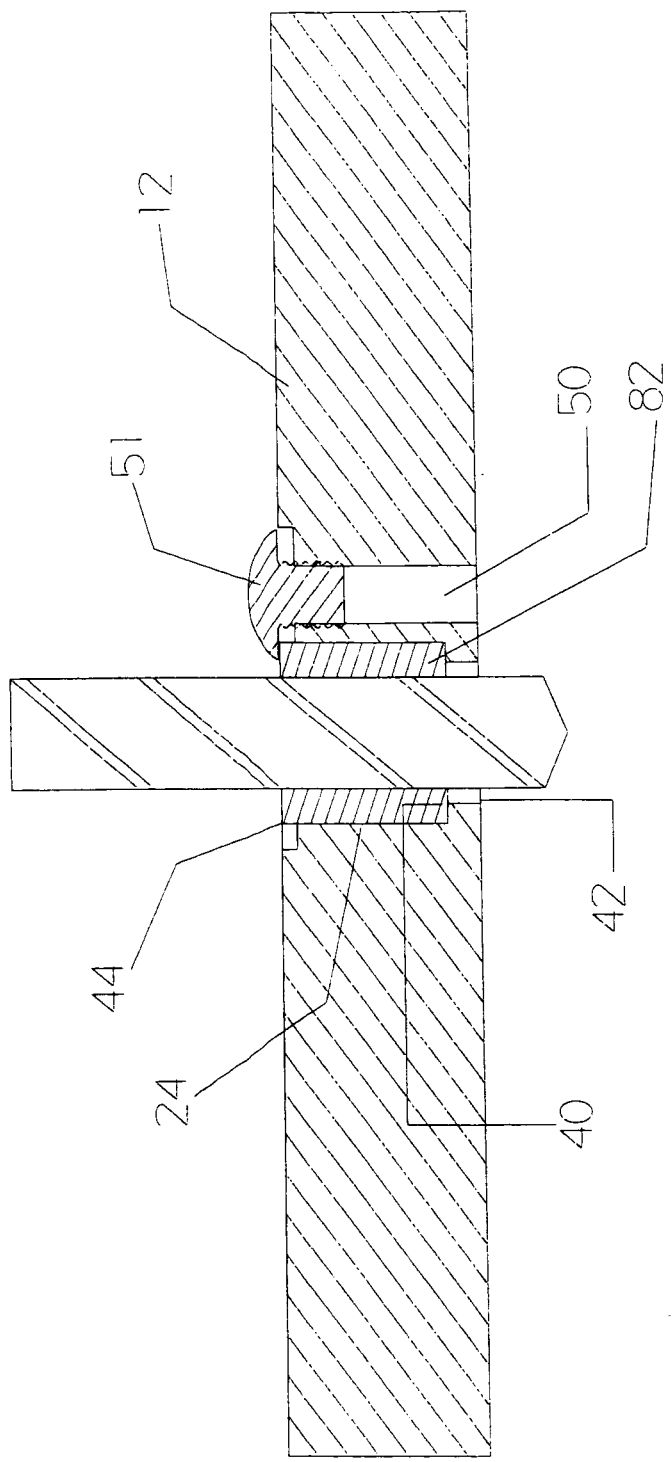
FIG. 5 is a schematic side sectional view of one of the apertures with a drill positioning sleeve positioned therein, according to an illustrative embodiment.

With reference now to the drawings, and in particular to FIGS. 1 through 7 thereof, a new apparatus facilitating removal of broken fasteners from an engine embodying the principles and concepts of the disclosed subject matter will be described.

The disclosure relates to an apparatus 10 for removing broken fasteners from an engine cylinder head, and the apparatus may also be employed for repairing the mounting for the fastener in the cylinder head. The cylinder head typically has a plurality of bores formed therein, and each of the bores may be internally threaded, with each of the bores removably receiving an externally-threaded fastener that engages the internally-threaded bore. In some cases the fastener is a stud, in other cases the fastener is a bolt, but in either case the shaft of the fastener may break off above or below the surface of the cylinder head, and the broken shaft needs to be removed. A manifold may be secured to the cylinder head by use of the fastener, either by positioning the manifold over a protruding portion of the shaft of a stud, and threading a nut on the stud, or by inserting a bolt through the manifold and threading the fastener into the bore.

The apparatus 10 generally comprises a guide plate 12, and at least one sleeve 14 removably mountable on the plate. The guide plate 12 may be generally elongated in one dimension, and may have elongated side edges 16, 17 and end edges 18, 19 that extend between the side edges. The guide plate 12 has a first surface 20 and a second surface 22, with the second surface being designed for positioning toward the cylinder head of the engine. The guide plate 12 may have a plurality of apertures 24 formed therein to correspond to the positions of the bores of cylinder heads. Each of the apertures 24 may extend through the guide plate 12 from the first surface 20 to the second surface 22. Each aperture 24 may have an inner surface 25, and the inner surface is substantially cylindrical and substantially smooth without ridges, valleys or threads.

Significantly, the plurality of apertures 24 may include a first group 26 of apertures and a second group 28 of apertures. The locations of the apertures 24 in the first group 26 may correspond to the locations of a plurality of bores in a first cylinder head design, and these locations may not correspond to the locations of a plurality of bores in a second cylinder head design. The locations of the apertures 24 in the second group 28 may correspond to the locations of the plurality of bores in the second cylinder head design but may not correspond to the locations of the plurality of bores in the first cylinder head design. In such embodiments, the same plate 12 may be used on more than one cylinder head design for more than one different engine design, and thus the need for an additional guide plate may be eliminated.

The locations on the guide plate 12 of the apertures 24 in the first group 26 may be substantially linearly aligned, and the linear alignment of the apertures in the first group may extend from the first end to the second end of the guide plate. In some embodiment, the linear alignment may be located substantially medially between the first 16 and second 17 side edges. The first group 26 may include five apertures in the linear alignment, although the number of apertures may vary depending upon the engine design.

The locations on the guide plate 12 of the apertures 24 in the second group 28 may be located on either lateral side of the substantially linear alignment of the first group 26 of apertures 24. A first portion 32 of the second group 28 of apertures may be positioned on the plate 12 on a first side 36 of the linear alignment of the first group of apertures, and a second portion 34 of the second group may be positioned on a second side 38 of the linear alignment. The second group 28 may include nine apertures, although the number of apertures may vary upon the engine design, and four of the apertures may be located in the first portion of the second group, and five of the apertures may be located in hr second portion.

Each of the apertures 24 may have an inner surface 30, and the inner surface may be substantially cylindrical in shape. Preferably, the inner surface 30 is substantially smooth in character without ridges or valleys of any significance. Each of the apertures 24 may include an interior shoulder 40 located towards the second surface 22 of the guide plate 12. Each of the apertures may include a first section 46 with a first diameter and a second section 48 with a second diameter, and the second diameter may be smaller then the first diameter to form the shoulder of the aperture 24. An opening 42 of the aperture 24 in the second surface 22 may be smaller than an opening 44 of the aperture in the first surface to thereby form the shoulder.

The apparatus 10 may also include sleeve securing structures that may be associated with each of the apertures 24 to removably secure one of the drill positioning sleeves in the aperture. In some embodiments of the apparatus (such as shown in FIGS. 1 through 5, an auxiliary bore 50 is formed in the guide plate 12 at a location adjacent to each of the apertures 24. The auxiliary bore 50 may be formed in the first surface 20 of the guide plate, and the bore 50 may or may not extend through the guide plate to the second surface. The auxiliary bore 50 may be internally threaded for receiving the shaft of a fastener, and the auxiliary bore may be positioned sufficiently close to the aperture 24 such that a portion of a head of the fastener (when threaded into the auxiliary bore 50) extends over the opening of the aperture. By this structure, a fastener 51 mounted in the auxiliary bore may be tightened to secure a sleeve positioned in the aperture.

Figure 6:
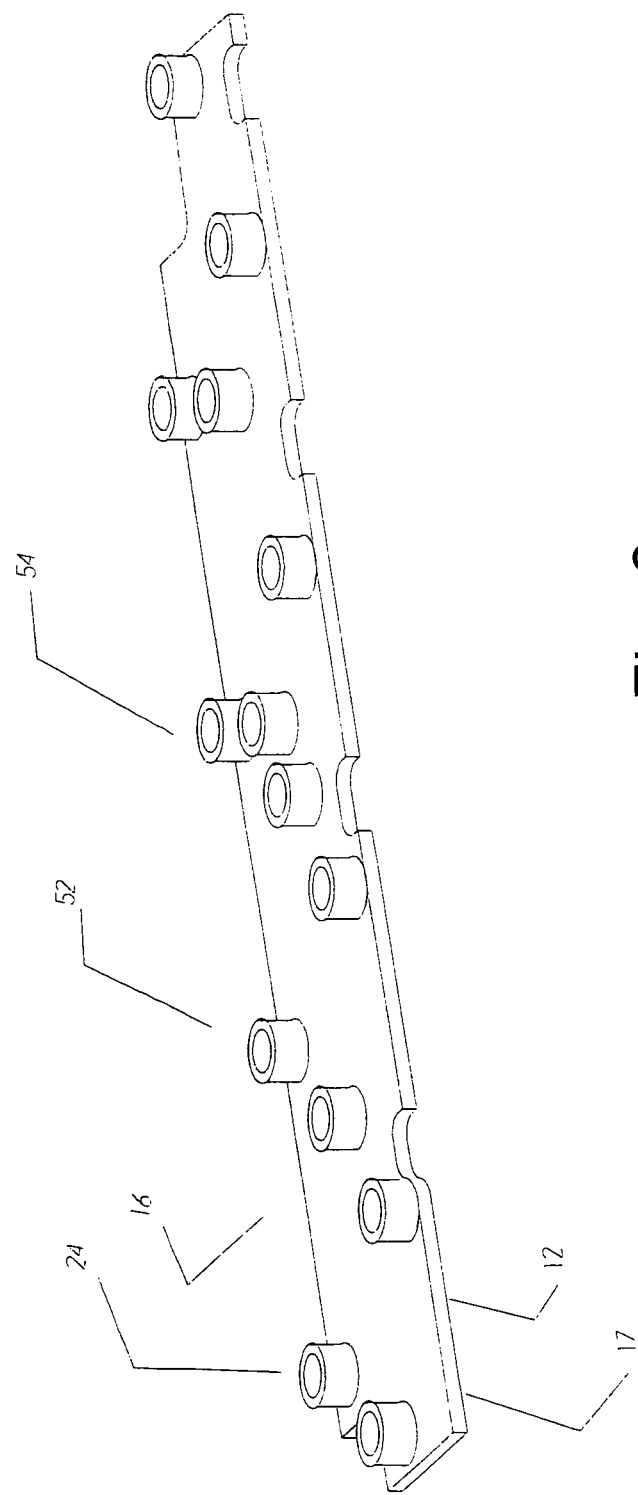
FIG. 6 is a schematic perspective view of an embodiment of the apparatus with optional features such as raised collars.
Figure 7:
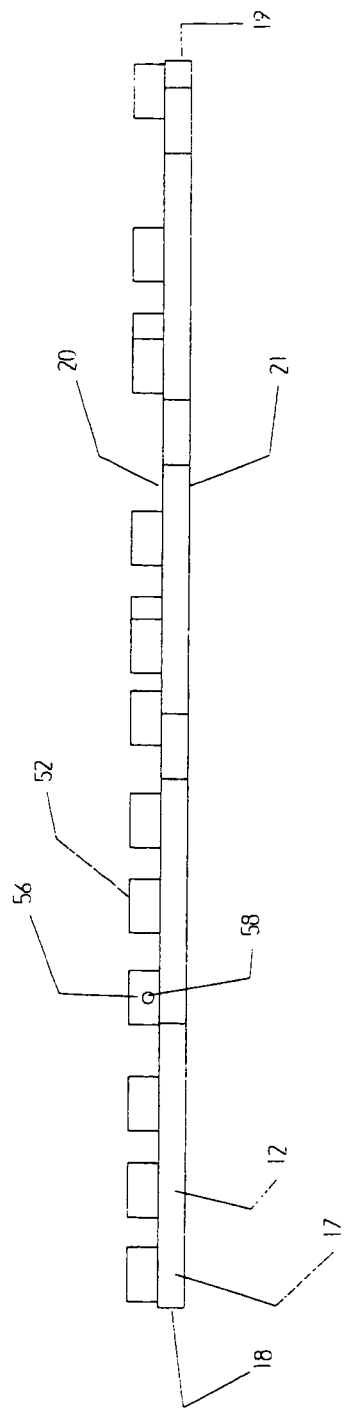
FIG. 7 is a schematic side view of the embodiment of the apparatus shown in FIG. 6.

In some embodiments of the apparatus (such as shown in FIGS. 6 and 7), a raised collar 52 is associated with each of the apertures 24. The raiser collar 52 may define an interior surface 54 of at least a portion of the aperture 24. The raised collar 52 may extend outwardly from the first surface 20 of the guide plate 12. A set screw hole 56 may be being formed though a wall of the raised collar 52 at a location that is spaced from the first surface 20 of the guide plate. A set screw 58 may be positioned in the set screw hole 56, and may have threads that engage threads formed on the interior of the set screw hole. The set screw 58 may be advanced in the set screw hole to bear against a sleeve positioned in the aperture.

The apparatus 10 may include at least one tap guide sleeve 60 as one of the positioning sleeve. The tap guide sleeve 60 is removably insertable into one of the apertures 24 for guiding a tap that is inserted through the sleeve 60, to facilitate correct positioning of the tap with respect to the cylinder head when the guide plate is secured to the head. The tap guide sleeve 60 has an exterior surface 62 and an interior surface 64, and the interior surface may be threaded to engage threads on a tap. The exterior surface 62 may have a first portion 66 which may be substantially cylindrical in shape, and may be substantially smooth for abutting against the inner surface 25 of the aperture 24, and is able to freely rotate with respect to the aperture. The exterior surface 62 may also have a second portion 68 which may form a shoulder 69 that may abut against the first surface 20 of the guide plate when the tap guide sleeve 60 is inserted into the aperture 24. The second portion 68 of the exterior surface may have a hexagonal shape in order to be gripped by a wrench to allow holding of the sleeve 60 against rotation with respect to the plate.

The apparatus 10 may also include at least one securing element for removably securing the guide plate 12 to the cylinder head. The securing elements may be removably insertable into one of the apertures 24. The securing element may employ one of the bores from which a fastener employed to secure the manifold to the cylinder head has been removed. One or more securing elements may be employed to secure the guide plate in position on the cylinder head, and preferably the securing elements are positioned in apertures in the guide plate that do not correspond to the bore or bores that have broken fasteners that need to be removed. The securing elements hold the guide plate in position so that the apertures, and particularly the unoccupied apertures, are aligned with the bores in the cylinder head, particularly the bore or bores having a broken fastener. The securing element may comprise a securing bolt 70 that is insertable into one of the bores of the cylinder head, and the securing bolt may have a first portion 72, which may be threaded to engage threads in one of the bores in the cylinder head. The securing bolt 70 may also have a second portion, which may have a substantially cylindrical shape that is positionable in one of the apertures, and may be sized with a diameter that is slightly smaller than the diameter of the aperture. The second portion 74 may form a shoulder 76 adjacent to the first portion for abutting against the interior shoulder 40 of the aperture 24. The securing bolt 70 may also have a third portion 78 which may form a head of the securing bolt with a shoulder 80 located adjacent to the second portion 74. The shoulder of the third portion 78 may be abuttable against the first surface 20 of the guide plate, although this is not critical as the shoulder 76 formed by the second portion abutting the interior shoulder 40 may sufficiently hold the guide plate against the cylinder head.

The apparatus 10 may also include guide elements for guiding the various tools employed to remove the broken fastener from the bore, and well as recondition the bore if necessary. The guide elements may comprise a plurality of drill positioning sleeves for removably positioning in the apertures 24 of the guide plate. The drill positioning sleeves may be positioned in one of the apertures, and the securing elements described above may be employed to securing the positioning sleeve in the aperture (using a fastener threaded into the auxiliary aperture or the set screw in the set screw hole of the collar). Each of the drill positioning sleeves may have a substantially cylindrical exterior surface, and may be substantially smooth in character. The outer diameter of the sleeves may be slightly smaller than the diameter of the apertures to provide a snug fit.

The plurality of drill positioning sleeves may include a first drill positioning sleeve 82 for removably positioning in one of the apertures and guiding a first drill bit having a first diameter. The first sleeve has a first bore formed by a first interior surface with a diameter that is slightly larger than a diameter of the first drill bit.

The plurality of drill positioning sleeves may also include a second drill positioning sleeve 84 for removably positioning in one of the apertures and guiding a second drill bit having a second diameter. The second sleeve 84 may have a second bore formed by a second interior surface with a diameter slightly larger than a diameter of the second drill bit.

Significantly, the apparatus 10 minimizes the amount of manipulation or tools and parts in the confined spaces of the engine compartment. For example, the interior shoulder 40 functions to easily and quickly locate the parts (such as the sleeve) inserted into the aperture without the extra manipulation required for, for example, threading the part into the aperture.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. An apparatus for removing broken fasteners from an engine cylinder head having a plurality of internally-threaded bores formed therein, the apparatus comprising:
    a guide plate having a first surface and a second surface, the second surface being for positioning toward the cylinder head, the guide plate having a plurality of apertures formed therein to correspond to bores of cylinder heads, each of the apertures extending through the guide plate from the first surface to the second surface;
    at least one securing element for removably securing the guide plate to the cylinder head, the securing element being removably insertable into one of the apertures;
    a plurality of positioning sleeves removably positionable in the apertures of the guide plate; and
    sleeve securing structures associated with each of the apertures to removably secure one of the positioning sleeves in the aperture;
    wherein at least a portion of the plurality of apertures includes an interior shoulder such that one of the drill positioning sleeves is unable to pass completely through the aperture from the first surface to the second surface of the plate.

2. The apparatus of claim 1 wherein the plurality of apertures includes a first group of apertures and a second group of apertures, locations of the apertures in the first group corresponding to locations of a plurality of bores in a first cylinder head but not corresponding to locations of a plurality of bores in a second cylinder head, and locations of the apertures in the second group corresponding to locations of a plurality of bores in the second cylinder head but not corresponding to locations of a plurality of bores in the first cylinder head.

3. The apparatus of claim 2 wherein the locations of the apertures in the first group are substantially linearly aligned.

4. The apparatus of claim 3 wherein the locations of the apertures in the second group are located on either side of the substantially linear alignment of the first group of apertures.

5. The apparatus of claim 1 wherein each of the apertures has an inner surface, the inner surface being substantially cylindrical and substantially smooth.

6. The apparatus of claim 1 wherein the at least one securing element comprises a securing bolt insertable into the bores of the cylinder head, the securing bolt having a first portion threaded to engage threads in one of the bores in the cylinder head, the securing bolt having a second portion positionable in at least one of the apertures including the interior shoulder, the second portion forming a shoulder adjacent to the first portion for abutting against the interior shoulder of the aperture.

7. The apparatus of claim 1 wherein the sleeve securing structure comprises an auxiliary bore is formed in the first surface of the guide plate adjacent to each of the apertures, a fastener being removably threaded in the auxiliary bore, the auxiliary bore being positioned sufficiently close to the aperture such that a portion of a head of the fastener threaded into the auxiliary bore extends over the opening of the aperture in the first surface.

8. The apparatus of claim 1 wherein a raised collar is associated with each of the apertures, the raised collar defining an interior surface of at least a portion of the aperture, a set screw hole being formed through a wall of the raised collar, a set screw being positioned in the set screw hole.

9. The apparatus of claim 1 wherein the plurality of positioning sleeves includes a tap guide sleeve for guiding a tap, the tap guide sleeve being insertable into one of the apertures, the tap guide sleeve having an exterior surface and an interior surface, the interior surface of the tap guide sleeve being threaded to engage threads on a tap.

10. The apparatus of claim 9 wherein the exterior surface of the tap guide sleeve has a first portion that is substantially cylindrical and substantially smooth, the exterior surface having a second portion having a hexagonal shape to be gripped by a wrench.

11. The apparatus of claim 1 wherein the plurality of positioning sleeves include a first drill positioning sleeve for guiding a first drill bit having a first diameter, the first drill positioning sleeve being removably positionable in one of the apertures, the first sleeve having a first bore having a diameter slightly larger than a diameter of the first drill bit.

12. An apparatus for removing broken fasteners from an engine cylinder head having a plurality of internally-threaded bores formed therein, the apparatus comprising:
   a guide plate having a first surface and a second surface, the second surface being for positioning toward the cylinder head, the guide plate having a plurality of apertures formed therein to correspond to bores of cylinder heads, each of the apertures extending through the guide plate from the first surface to the second surface;
   at least one securing element for removably securing the guide plate to the cylinder head, the securing element being removably insertable into one of the apertures;
   a plurality of positioning sleeves removably positionable in the apertures of the guide plate; and
   sleeve securing structures associated with each of the apertures to removably secure one of the positioning sleeves in the aperture;
   wherein each of the apertures includes an interior shoulder located towards the second surface of the guide plate; and
   wherein the at least one securing element comprises a securing bolt insertable into the bores of the cylinder head, the securing bolt having a first portion threaded to engage threads in one of the bores in the cylinder head, the securing bolt having a second portion with a substantially cylindrical shape positionable in one of the apertures, the second portion forming a shoulder adjacent to the first portion for abutting against the shoulder of the aperture.

13. An apparatus for removing broken fasteners from an engine cylinder head having a plurality of internally-threaded bores formed therein, the apparatus comprising:
   a guide plate having a first surface and a second surface, the second surface being for positioning toward the cylinder head, the guide plate having a plurality of apertures formed therein to correspond to bores of cylinder heads, each of the apertures extending through the guide plate from the first surface to the second surface, each of the apertures having a substantially smooth inner surface and including an interior shoulder located towards the second surface of the guide plate;
   at least one securing element for removably securing the guide plate to the cylinder head, the securing elements being removably insertable into one of the apertures;
   a plurality of positioning sleeves removably positionable in the apertures of the guide plate;
   wherein at least a portion of the plurality of apertures includes an interior shoulder such that one of the drill positioning sleeves is unable to pass completely through the aperture from the first surface to the second surface of the plate; and
   a securing bolt insertable into the bores of the cylinder head, the securing bolt having a first portion threaded to engage threads in one of the bores in the cylinder head, the securing bolt having a second portion positionable in at least one of the apertures including the interior shoulder, the second portion forming a shoulder adjacent to the first portion for abutting against the interior shoulder of the aperture.

14. The apparatus of claim 13 wherein the plurality of apertures includes a first group of apertures and a second group of apertures, locations of the apertures in the first group corresponding to locations of a plurality of bores in a first cylinder head but not corresponding to locations of a plurality of bores in a second cylinder head, and locations of the apertures in the second group corresponding to locations of a plurality of bores in the second cylinder head but not corresponding to locations of a plurality of bores in the first cylinder head.

15. The apparatus of claim 14 wherein the locations of the apertures in the first group are substantially linearly aligned.

16. The apparatus of claim 15 wherein the locations of the apertures in the second group are located on either side of the substantially linear alignment of the first group of apertures.

17. The apparatus of claim 13 wherein the interior shoulder is located towards the second surface of the guide plate.

18. The apparatus of claim 13 further including sleeve securing structures associated with each of the apertures to removably secure one of the positioning sleeves in the aperture.

* * * * *